United States Patent [19]

Sibigtroth

[11] Patent Number: 4,649,476
[45] Date of Patent: Mar. 10, 1987

[54] MICROCOMPUTER HAVING AN INTERNAL ADDRESS MAPPER

[75] Inventor: James M. Sibigtroth, Austin, Tex.

[73] Assignee: Motorola, Inc., Schaumburg, Ill.

[21] Appl. No.: 547,192

[22] Filed: Oct. 31, 1983

[51] Int. Cl.[4] .................... G06F 12/02; G06F 13/00
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 4,378,590 | 3/1983 | Kim ..................................... | 364/200 |
| 4,384,342 | 5/1983 | Imura et al. ......................... | 364/900 |
| 4,407,016 | 9/1983 | Bayliss et al. ....................... | 364/200 |
| 4,435,763 | 3/1984 | Bellay et al. ........................ | 364/200 |
| 4,473,878 | 9/1984 | Zolnowsky et al. ................ | 364/200 |

Primary Examiner—Archie E. Williams
Assistant Examiner—William G. Niessen
Attorney, Agent, or Firm—John A. Fisher; Jeffrey Van Myers

[57] ABSTRACT

In a microcomputer, an address mapper allows the user to selectively map a resource which is ordinarily addressable in one portion of the address range of the microcomputer into a correspondingly sized area elsewhere in the address range. Using a resource map address stored by the user in an addressable map register, the mapper continuously compares the map address to a corresponding number of bits on the microcomputer's address bus. When a match is detected, the mapper enables the address decoder of the mapped resource. The mapper can also map the map register. Since the mapper can map more than one resource, an interlock mechanism resolves access conflicts.

3 Claims, 2 Drawing Figures

MICROCOMPUTER HAVING AN INTERNAL ADDRESS MAPPER

TECHNICAL FIELD

The present invention relates generally to microcomputers, and, more particularly, to a microcomputer having an internal address mapper.

BACKGROUND ART

In microprocessors of the memory mapped I/O type, communication with external devices is accomplished by initially writing commands and output data to predetermined addresses within the address range of the microprocessors, and thereafter reading status and input data from the same or other predetermined addresses within that address range. In certain of these microprocessors, communication with external devices was made particularly efficient by dedicating the lowest addresses for such use. For example, in the Motorola MC6800, all addresses fully representable in eight (8) bits or less were reserved for such I/O functions. By assuming that all other upper address bits were zero, all I/O became possible using only addresses within this "page zero" and I/O commands could be compressed into two (2) word or "direct memory address mode" instructions, thus saving the fetching of the third or "extended address" word.

With the advent of single chip microcomputers, small amounts of no-chip, random-access, read/write memory became available to the user. In certain of these microcomputers, such as the MC6801, access to such read/write memory was similarly optimized by assigning some or all of the remaining addresses in "page zero" to such memory. As advances in technology allowed increased read/write memory and additional I/O control functions, it soon became impossible to fit both into "page zero". Since some users found it more desireable to have efficiency of access to the read/write memory rather than efficiency of I/O, microcomputers became available with either I/O or the read/write memory mapped into "page zero". Since each particular configuration had to be fabricated by the manufacturer using different mask sets, the user had to make his choice at the time his order was placed. If the choice later turned out to have been less than advantageous, the user either had to accept less than optimal performance or had to scrap his initial purchase and buy anew.

In some applications, the user may wish to integrate an additional microcomputer into an existing system which already has "page zero" dedicated to other functions. For example, in the Motorola EXORciser development system, all of "page zero" is assumed to be global read/write memory and certain key system variables are located therein. In such situations, the user will either have to pay a manufacturer to fabricate a special version of the preferred microcomputer, or select an existing, but otherwise less desirable, microcomputer which already has a compatible memory map.

SUMMARY OF THE INVENTION

Accordingly, it is an object of the present invention to provide a microcomputer which has an internal address mapper for mapping the addressable resources of the microcomputer into a user selected portion of the address range of the microcomputer.

Another object of the present invention is to provide a microcomputer having an internal address mapper which allows the user to selectively map at least a portion of the internally addressable resources of the microcomputer into the microcomputer's address space.

Yet another object of the present invention is to provide a microcomputer which has an internal address mapper capable of mapping one or more selected blocks of addresses representing distinct resources within the address range of the microcomputer into other portions of the address space.

Still another object of the present invention is to provide a microcomputer having an internal address mapper which is particularly efficient and effective both in terms of circuitry and operation.

These and other objects of the present invention are accomplished in a microcomputer having an address bus for selectively communicating addresses comprising at least first and second sets of address bits, and a resource which performs a predetermined function in response to the coincidence of an enable signal and a predetermined address on the first set of address bits. According to the present invention, the microcomputer is also provided with an address mapper comprising a map register which selectively stores a resource map address having the same number of bits as the second set of address bits, and a comparator which compares the resource map address to the second set of address bits on the address bus and then provides the enable signal to the resource only when the second set of address bits is identical to the resource map address.

DESCRIPTION OF THE INVENTION

Figure 1:
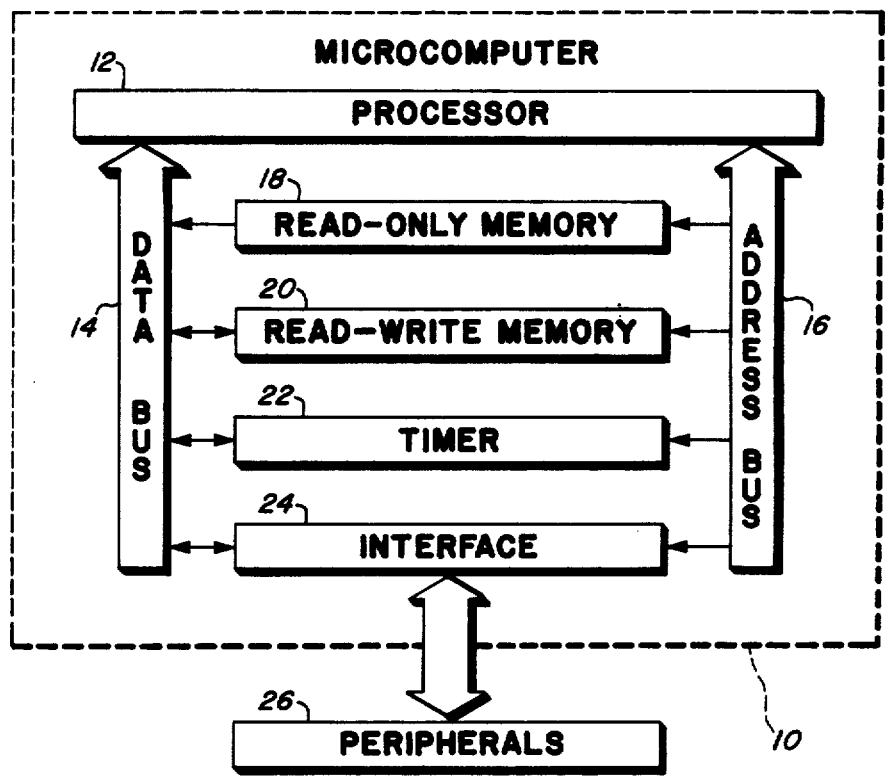
FIG. 1 is a block diagram of a microcomputer suitable for practicing the present invention.

Shown in FIG. 1 is a microcomputer 10 having a processor 12 which is connected via a data bus 14 and an address bus 16 with a read-only memory (ROM) 18 which stores programs and other fixed data, a read/write memory (RWM) 20 which stores variable control and processing information, a timer 22 which maintains timing information useful to the processor 12, and a communication interface 24 which interacts with external devices such as the peripheral 26. In operation, the processor 12, acting under the control of instructions retrieved from ROM 18, can selectively retrieve subsequent instructions from ROM 18 by providing appropriate addresses on the address bus 16. The processor 12 can also selectively access particular storage locations in RWM 20 by providing corresponding addresses on address bus 16. As appropriate, the processor 12 can exercise various functions of timer 22 by providing on address bus 16 the addresses of respective timer registers within timer 22. Similarly, the processor 12 can selectively induce interface 24 to perform particular input/output (I/O) functions using the peripherals 26 by providing on the address bus 16 the addresses of particular interface registers within interface 24. In all such interchanges, the processor 12 uses the address bus to select the desired resource (i.e. ROM 18, RWM 20, timer 22 or interface 24), while using the data bus 14 to communicate the appropriate information (e.g. instruction, data or command).

In a typical microcomputer, each of the several resources will include an integral address decoder of conventional form for detecting the address or addresses assigned to that particular resource within the overall address range of the microcomputer. Since address assignment is done at the time of fabrication, these decoders are implemented in fixed logic and cannot be forced by the user to respond to different addresses. In the preferred form of the present invention, the user is provided with the capability to selectively modify the operation of one or more of the address decoders of the several resources.

Figure 2:
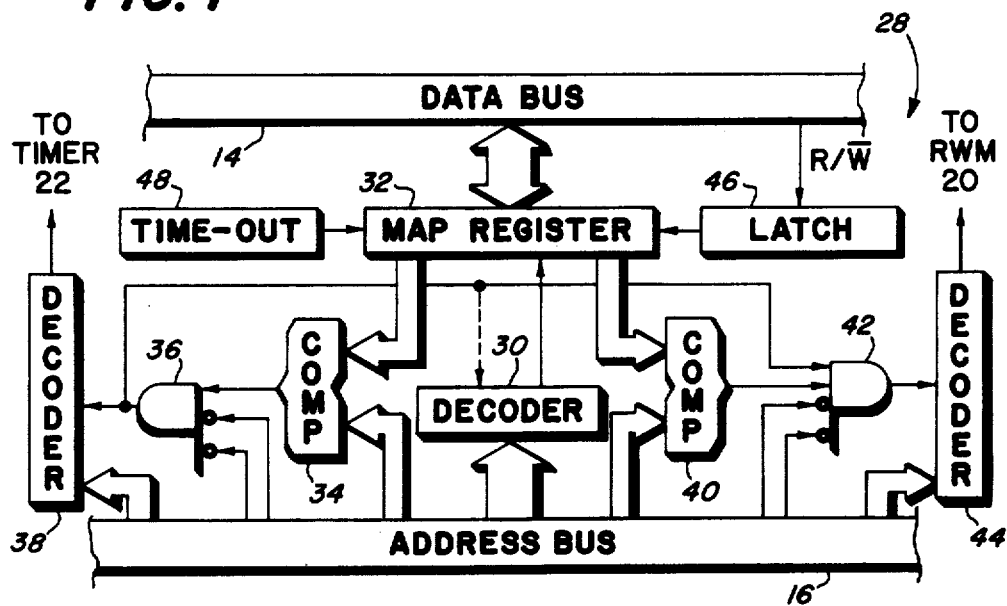
FIG. 2 is a schematic diagram of an address mapper suitable for use in the microcomputer of FIG. 1.

Shown in FIG. 2 is an address mapper 28 which allows the user to select the address range within which the address decoders of selected resources will be enabled. In the illustrated form, an address decoder 30 will respond to a particular address on address bus 16 by enabling a map register 32 to load a pair of resource map addresses provided simultaneously by the processor 12 on data bus 14. Thereafter, a comparator 34 will continuously compare the first of the resource map addresses in map register 32 to a corresponding number of, for example, the high-order bits on address bus 16, and will enable a gate 36 when this set of address bits is identical to the first resource map address. Gate 36, in turn, will then enable an address decoder 38 of a particular resource, say timer 22 or interface 24 or both, to respond to an appropriate low-order set of address bits on address bus 16 provided that the balance of the address bits, if any, are all zero. Thus, the decoder 38 will be enabled only when the address on address bus 16 is within the address range defined by the user as the first of the resource map addresses in the map register 32.

In a similar manner, a comparator 40 continuously compares the second of the resource map addresses in map register 32 to a corresponding number of, for example, the high-order bits on address bus 16, and will enable a gate 42 when this set of address bits is identical to the second resource map address. Gate 42 will then enable the address decoder 44 of another resource, say ROM 18 or RWM 20, to respond to an appropriate low-order set of address bits on address bus 16 provided that the balance of the address bits, if any, are zero. Accordingly, the decoder 44 will be enabled only when the address on address bus 16 is within the address range defined by the user as the second of the resource map addresses in the map register 32.

In some applications, the user may wish to map more than one of the resources controlled by address mapper 28 into the same address range, even though to do so sacrifices a portion of one of the resources. For example, the user may choose to use the few registers in timer 22 in place of the lowest addressable locations in RWM 20. Using the present invention, the user need only load the same map address value into both the first and second resource map addresses in map register 32. The address mapper 28 automatically resolves the resource conflict when the processor 12 addresses a register within timer 22, since gate 36 not only enables the decoder 38 of timer 22, but also disables gate 40 from simultaneously enabling the decoder 44 of RWM 20.

If desired, the map register 32 may be mapped similarly to the registers within timer 22 and interface 24 by allowing gate 36 to selectively enable decoder 30. In this form, decoder 30 will enable map register 32 to load a new pair of resource map addresses only when the address on address bus 16 is within the range specified in the first map address. By forcing both of the resource map addresses in map register 32 to a particular initial value, say all zeros, upon power-up or reset, processor 12 can access map register 32 using a known address. Thereafter, the user's program must keep track of the mapped location of the map register 32. To facilitate this, the map register 32 can be periodically read to determine the current resource map addresses.

Just as the ability to remap the addresses of the several resources is a very powerful capability when used correctly, the same capability used incorrectly may easily result in disaster. It is therefore appropriate in most applications to restrict, as much as possible, the opportunities for exercising this power. To this end, the preferred embodiment incorporates two safeguards: a write protect latch 46, and a time-out 48. Upon either power-up or reset, both latch 46 and time-out 48 are reset. Thereafter, at least until time-out 48 times out, latch 46 will enable map register 32 to be loaded once but only once. After time-out 48 has timed out, map register 32 can not be loaded, even if map register 32 has not yet been loaded. Setting time-out 48 to time out after only a relatively small number of processor clock cycles assures that map register 32 can be loaded, if such is in fact desired, only by one of the very first instructions executed by the processor 12 coming out of the power-up/reset sequence. Thus, even if the program later becomes lost and begins executing erroneous code, at least the map register 32 is protected against inadvertent destruction.

Although the present invention has been described in the context of the preferred embodiment, various changes and modifications will be readily evident to those skilled in the art. For example, if there are no address bits on address bus 16 which are neither mapped by address mapper 28 nor decoded by decoder 38, then gate 36 may be deleted. Similarly, gate 42 may be simplified if the sum of the bits mapped by address mapper 28 and those decoded by decoder 44 correspond to the number of address bits on address bus 16. However, before deleting gate 42, precautions should be implemented in some other manner to resolve access conflicts in the event that the resource enabled by decoder 44 is inadvertently mapped into the same address(es) as the resource enabled by decoder 38.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

What is claimed is:

1. In a microcomputer comprising:
   an address bus for communicating addresses comprising at least a first set of address bits and a second set of address bits;
   a first resource for performing a predetermined function in response to the coincidence of a first enable signal and a first predetermined address on said first set of address bits; and
   a second resource for performing a predetermined function in response to the coincidence of a second enable signal and a second predetermined address on said first set of address bits;
   an address mapper comprising:
   map register means for storing a first and second resource map address, each having the same number of bits as said second set of address bits;

first comparator means coupled to said map register and to said address bus, for comparing said first resource map address to said second set of address bits, and for providing said first enable signal to said first resource only when said second set of address bits is identical to said first resource map address; and second comparator means coupled to said map register and to said address bus, for comparing said second resource map address to said second set of address bits, and for providing said second enable signal to said second resource only when said second set of address bits is identical to said second resource map address.

2. The microcomputer of claim 1 wherein said address mapper means further comprises gate means interposed between said second comparator means and said second resource for providing said second enable signal to said second resource only in response to the coincidence of said second enable signal and of said enable signal provided by the first said comparator means.

3. The microcomputer of claim 1 wherein said address bus further comprises a third set of address bits, and wherein said address mapper further comprises gate means interposed between said second comparator means and said second resource for providing the second enable signal to said second resource only in response to the coincidence of said enable signal provided by the first of said comparators and of said second enable signal provided by said second comparator means and of a selected address on said third set of address bits of said address bus.

* * * * *